(12) United States Patent
Hayashi

(10) Patent No.: US 7,304,010 B2
(45) Date of Patent: Dec. 4, 2007

(54) ALUMINUM OXIDE SINTERED BODY, AND MEMBERS USING SAME FOR SEMICONDUCTOR AND LIQUID CRYSTAL MANUFACTURING APPARATUSES

(75) Inventor: Masaki Hayashi, Gamo-gun (JP)

(73) Assignee: Kyocera Corporation, Kyoto (JP)

( * ) Notice: Subject to any disclaimer, the term of this patent is extended or adjusted under 35 U.S.C. 154(b) by 17 days.

(21) Appl. No.: 11/064,889

(22) Filed: Feb. 23, 2005

(65) Prior Publication Data

US 2005/0187094 A1    Aug. 25, 2005

(30) Foreign Application Priority Data

Feb. 23, 2004    (JP) ............... 2004-046661

(51) Int. Cl.
   *C04B 35/11*    (2006.01)
(52) U.S. Cl. ...................... 501/153; 501/127
(58) Field of Classification Search ................ 501/127, 501/153
   See application file for complete search history.

(56) References Cited

U.S. PATENT DOCUMENTS 5,854,159 A * 12/1998 Kato ........................ 501/127
6,482,761 B1 * 11/2002 Watanabe et al. ........... 501/153
2003/0008765 A1 * 1/2003 Niwa et al. ................. 501/153

FOREIGN PATENT DOCUMENTS

| EP | 0708065 | * | 5/1996 |
| JP | 403285865 | * | 12/1991 |
| JP | 4-50160 | * | 2/1992 |
| JP | 05-217946 | | 8/1993 |
| JP | 06-157132 | | 6/1994 |
| JP | 06157132 | * | 6/1994 |
| JP | 2000272951 | * | 10/2000 |

* cited by examiner

*Primary Examiner*—Karl Group
(74) *Attorney, Agent, or Firm*—Hogan & Hartson LLP

(57) ABSTRACT

An aluminum oxide sintered body contains aluminum oxide in an amount of not less than 99% by weight and at least one selected from magnesium oxide, calcium oxide and silicon oxide, and contains phosphorus of not more than 0.0025 parts by weight to 100 parts by weight of the aluminum oxide sintered body. This avoids that phosphorous exerts adverse effect on the sintering properties of an aluminum oxide sintered body, especially the sintering properties of a large aluminum oxide sintered body, causing the sintered body to lack uniformity between the sintered body inner portions and outer portions. Therefore, this aluminum oxide sintered body is suitably used in semiconductor manufacturing apparatus members or liquid crystal manufacturing apparatus members.

7 Claims, 1 Drawing Sheet

ALUMINUM OXIDE SINTERED BODY, AND MEMBERS USING SAME FOR SEMICONDUCTOR AND LIQUID CRYSTAL MANUFACTURING APPARATUSES

Priority is claimed to Japanese Patent Application No. 2004-46661 filed on Feb. 23, 2004, the disclosure of which is incorporated by reference in its entirety.

BACKGROUND OF THE INVENTION

1. Field of the Invention

The present invention relates to an aluminum oxide ($Al_2O_3$) sintered body, and a semiconductor manufacturing apparatus member and a liquid crystal manufacturing apparatus member, each of which uses the aluminum oxide sintered body.

2. Description of Related Art

At present, aluminum oxide sintered bodies are widely used in electronic parts and industrial machinery parts. Since aluminum oxide sintered bodies used for these purposes require excellent electrical properties, mechanical properties, chemical resistance, and plasma resistance, low soda aluminum oxide whose $Na_2O$ content is not more than 0.1% is commonly used. In the manufacturing process of the low soda aluminum oxide used herein, the prevailing practice is to add, when firing aluminum hydroxide that is the precursor of aluminum oxide, silicon oxide particles and aluminum chloride in order that $Na_2O$ contained in the aluminum hydroxide is removed by adsorption or reaction.

In respect to an aluminum oxide sintered body used in semiconductor manufacturing apparatus members, Japanese Patent Application Laid-Open No. 6-157132 describes a method of manufacturing a high purity aluminum oxide sintered body whose impurity content is reduced significantly. The method described includes: suppressing the alkali metal oxide in the aluminum oxide sintered body to not more than 50 ppm and the magnesium oxide content to 100 ppm; and in addition suppressing and controlling the entry of alkali metal from the manufacturing steps. Thereby, impurities become lessened and abnormal grain growth of aluminum oxide can be suppressed to attain the aluminum oxide sintered body excellent in plasma resistance.

Additionally, Japanese Patent Application Laid-Open No. 5-217946 describes a semiconductor manufacturing apparatus member that absorbs less microwave, prevents occurrence of cracks, and has excellent productivity. That is, an aluminum oxide sintered body having aluminum oxide of not less than 99.9%, silica of less than 100 ppm, and alkali metal oxide of not more than 50 ppm can have excellent plasma resistance and prevent the occurrence of cracks due to microwave, provided that a specific gravity is not less than 3.96, a mean particle size is not less than 10 µm, and a dielectric dissipation factor is not more than $8 \times 10^{-4}$.

Recently, in industrial machinery parts, especially semiconductor manufacturing apparatus members and liquid crystal manufacturing apparatus members, as devices become larger, parts used in these apparatuses are also increasingly larger. Aluminum oxide sintered bodies used therefor are no exceptions.

The problems especially in manufacturing a large aluminum oxide sintered body are forming and firing. When a forming body is fired to obtain a large aluminum oxide sintered body having a large wall thickness, a temperature distribution occurs at the forming body interior and the surface vicinity in the firing step, thereby facilitating advance sintering of the surface vicinity. Therefore, the surface vicinal portion and the interior often have different sintered states. Specifically, due to the fact that sintering does not proceed uniformly, the surface vicinity initially becomes a dense sintered body, while in the interior crystals fail to have sufficient grain growth, resulting in a sintered body with numerous voids. To solve this phenomenon, attempts are being made, for example, by the manufacturing method described in Japanese Patent Application Laid-Open No. 6-157132, and by extremely delaying firing temperature rise in the temperature range within which sintering proceeds. But in practice, no satisfactory results have been achieved, and therefore poor productivity.

In the aluminum oxide sintered body obtained by the manufacturing method described in Japanese Patent Application Laid-Open No. 6-157132, alkali metal entering from the manufacturing steps is suppressed and controlled. However, in normally used aluminum oxide powder, material containing phosphorous is used in soda-removing step for making aluminum oxide obtained by Bayer's process into low soda aluminum oxide, and therefore, in general, the obtained low soda aluminum oxide also contains phosphorous, and the phosphorous content is as much as over 0.0025% by weight. This hinders a uniform grain growth especially in a large aluminum oxide sintered body.

The aluminum oxide sintered body described in Japanese Patent Application Laid-Open No. 5-217946 has the following characteristics: Specific gravity is not less than 3.96; Mean particle size is not less than 10 µm; and Dielectric dissipation factor is not more than $8 \times 10^{-4}$. However, as in Japanese Patent Application Laid-Open No. 6-157132, there is no finding with regard to grain growth inhibition due to phosphorous contained in low soda aluminum oxide serving as raw material.

Thus, in the conventional aluminum oxide sintered bodies, because the surface vicinity and the interior have different sintered states as above described, there arises a large difference in density between the surface vicinity and the interior. Therefore, the obtained aluminum oxide sintered body has a large dielectric dissipation factor value. The use of such an aluminum oxide sintered body in semiconductor manufacturing apparatus members degrades microwave permeability and hence the aluminum oxide sintered body generates heat, which can cause cracks to reduce the lifetime of the semiconductor manufacturing apparatus members.

SUMMARY OF THE INVENTION

The present inventor had many close examination for solving the above problems and found that the sintering step of a large aluminum oxide sintered body is seriously affected by the presence of phosphorous contained in the aluminum oxide sintered body. Specifically, the presence of phosphorous hinders progression of a uniform sintering and leaves numerous voids within the sintered body in the sintering step. Further, the presence of phosphorous produces a difference between the mean crystal particle size in the surface vicinity and that in the sintered body interior.

An aluminum oxide sintered body of the present invention is composed of aluminum oxide, the content of which is not less than 99% by weight, and at least one selected from magnesium oxide, calcium oxide and silicon oxide, and further includes phosphorus of not more than 0.0025 parts by weight to 100 parts by weight of the aluminum oxide sintered body.

Such a reduction in phosphorous content permits an aluminum oxide sintered body of uniform structure with a small difference in density between the surface vicinity and the interior. As a result, the dielectric dissipation factor value of the aluminum oxide sintered body is lowered and hence microwave permeability can be improved. It is therefore possible to suppress occurrence of cracks due to heat generation of the aluminum oxide sintered body, thereby suppressing a reduction in the lifetime of a semiconductor manufacturing apparatus member.

A semiconductor manufacturing apparatus member and a liquid crystal manufacturing apparatus member of the present invention, each of which is composed of the above-mentioned aluminum oxide sintered body, are excellent in plasma resistance and chemical resistance, and also excellent in durability and stability of plasma processing speed such as etching.

The aluminum oxide sintered body of the present invention can be used effectively in other industrial machinery members, such as grinder members, pump members, and slide members, in addition to semiconductor manufacturing apparatus members and liquid crystal manufacturing apparatus members.

DESCRIPTION OF PREFERRED EMBODIMENTS

Figure 1:
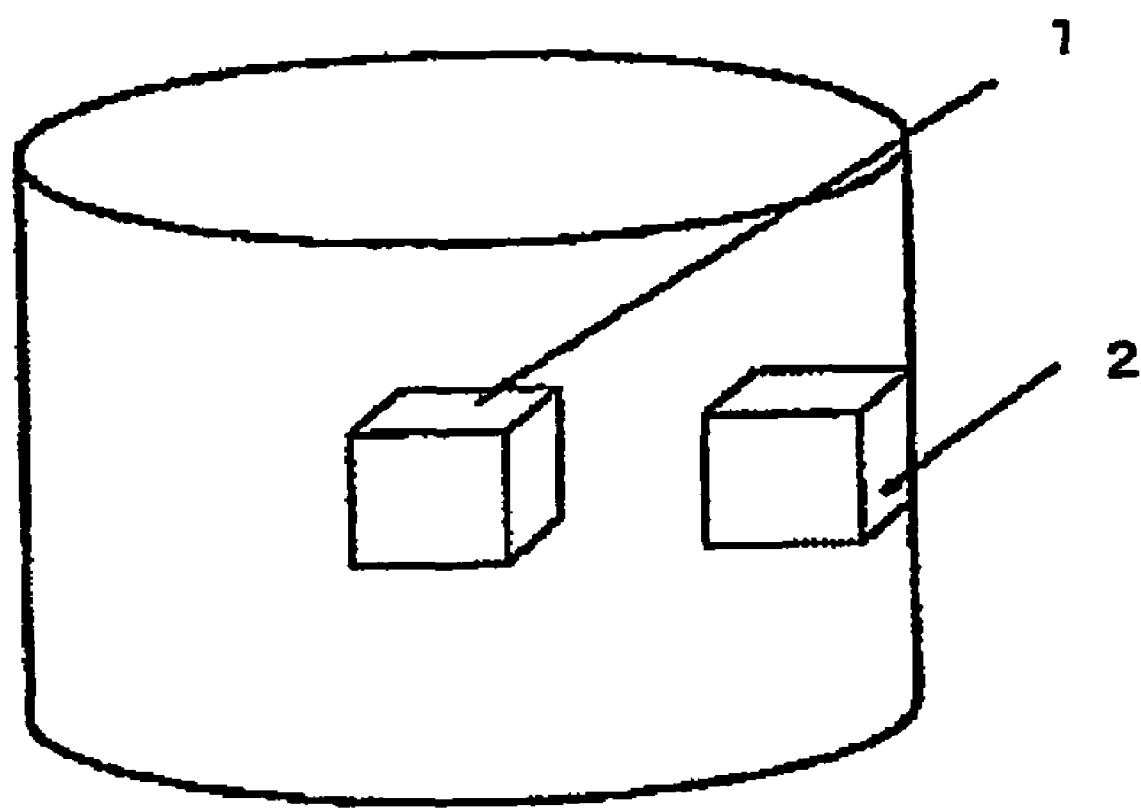
FIG. 1 is an explanatory drawing to explain a surface vicinity density and an interior density in an aluminum oxide sintered body of the present invention.

An aluminum oxide sintered body of the present invention contains aluminum oxide of not less than 99% by weight, and further contains at least one selected from magnesium oxide, calcium oxide and silicon oxide. This aluminum oxide sintered body contains phosphorus of not more than 0.0025 parts by weight to 100 parts by weight of the sintered body.

Any action of hindering a uniform sintering of aluminum oxide cannot be observed by controlling the phosphorous content to not more than 0.0025 parts by weight. The phenomenon that phosphorous hinders sintering of aluminum oxide seems to be attributable to the followings: Phosphorous functions as a strong sintering agent thereby to facilitate sintering in the sintered body surface vicinity that is susceptible to heat during the sintering step; and Densification proceeds in the surface vicinity alone at the earliest stage, and voids remain in the interior. Therefore, the phosphorous content exceeding 0.0025 parts by weight hinders a uniform sintering, resulting in a sintered body having numerous voids at its interior. That is, there is a large difference in density between the surface vicinity and the interior of a single sintered body.

The aluminum oxide sintered body is specified as a high-purity sintered body whose aluminum oxide content is not less than 99% by weight. This is because the sintering step proceeds mainly by solid phase reaction and becomes susceptible to the influence of a trace impurity. Particularly, the presence of phosphorous exerts serious influence on the sintering step of aluminum oxide. This tends to appear as voids and a difference in density between the sintered body interior and the outer portions. On the other hand, when the aluminum oxide content is less than 99% by weight, the sintering step proceeds mainly by liquid phase sintering, and hence is less susceptible to the influence of impurity such as phosphorous. This is therefore hard to become a factor in hindering the sintering step.

As subsidiary component constituting the residue other than aluminum oxide, at least one of magnesium oxide, calcium oxide, and silicon oxide is contained. This allows for sintering at a sintering temperature in consideration of high-volume manufacturing. In the absence of such subsidiary component, a sintering temperature exceeding 1700° C. is required, which is not practical.

The content of such a subsidiary component is in the range of 0.8% by weight to 0.05% by weight in terms of oxide. With a subsidiary component exceeding 0.8% by weight, plasma resistance and chemical resistance are lowered, which are unsuitable for semiconductor manufacturing apparatus members and liquid crystal manufacturing apparatus members. With a subsidiary component of less than 0.05% by weight, that fails to become a sufficient sintering agent in the sintering step of aluminum oxide sintered body, and it is therefore difficult to obtain a dense sintered body.

In the present invention, phosphorous content is more preferably not more than 0.0020 parts by weight, particularly 0.0015 parts by weight. When the phosphorous content is not more than 0.0020 parts by weight, it is possible to further equalize the density difference between the surface vicinity and the interior in the aluminum oxide sintered body. The content of not more than 0.0015 parts by weight acts more effectively on maintenance of a uniform density difference especially when aluminum oxide purity is as high as not less than 99.5%.

Phosphorous content can be measured by ICP emission spectrochemical analysis. To control the phosphorus content to not more than 0.0025 parts by weight in an aluminum oxide sintered body, it is necessary to suppress the total phosphorus content in a raw material used to not more than 0.0025 parts by weight, and also avoid the entry of phosphorus from the manufacturing steps, as will be described later. It is especially important to suppress the content of phosphorus in aluminum oxide powder as main component. Preferably, it should be not more than 0.0025 parts by weight.

It is further desirable that the aluminum oxide sintered body of the present invention has not more than 0.05 g/cm$^3$ in the difference in density between the surface vicinity and the interior. This decreases its dielectric dissipation factor value and improves its microwave permeability. It is therefore possible to suppress occurrence of cracks due to heat generation of the aluminum oxide sintered body, thereby suppressing a reduction in the lifetime of a semiconductor or a liquid crystal manufacturing apparatus member. This is because the phosphorous content of not more than 0.0025 parts by weight permits a uniform grain growth both in the surface vicinity and the interior, so that the voids remaining in the interior can be reduced to minimize the density difference.

On the other hand, when the density difference exceeds 0.05 g/cm$^3$, numerous voids are present in the interior, so that the value of dielectric dissipation factor increases to make it easy for cracks to occur due to heat generation. Hence, there may arise the problem that, when used as a semiconductor or a liquid crystal manufacturing apparatus member, corrosion resistance is lowered to reduce the lifetime.

Preferably, the surface vicinity density of the aluminum oxide sintered body is not less than 3.90 g/cm$^3$. This permits a reduction of pores in the surface vicinity. For example, when plasma is irradiated to the sintered body surface, void portions existing at grain boundaries of the sintered body can be suppressed to improve plasma resistance.

As used herein, the term "difference in density between the surface vicinity and the interior" means a difference between the density of Sample 2 cut out of a surface vicinity of the sintered body and the density of Sample 1 cut out of the sintered body interior, as shown in FIG. 1. The present invention is effective especially for thick-wall aluminum oxide sintered bodies having a wall-thickness of not less than 20 mm. Herein, the term "density" means apparent density, which can be measured by Archimedes' method.

The dielectric dissipation factor value of the aluminum oxide sintered body of the present invention is desirably not more than $10 \times 10^{-4}$. This permits a better control of microwave permeability and satisfactory suppression of occurrence of cracks. On the other hand, with a dielectric dissipation factor exceeding $10 \times 10^{-4}$, microwave absorption may occur and cracks due to heat generation tend to occur. Therefore, when used as a semiconductor or a liquid crystal manufacturing apparatus member, due to heat generation, permeability may decrease and the member may crack and break in some cases.

As used herein, the term "dielectric dissipation factor" in the present invention means one measured by bridge circuit method at a frequency of 1 MHz. Even when dielectric dissipation factors at a high-frequency region (10 to 1000 MHz) are measured by high-frequency current voltage method, however, the aluminum oxide sintered body of the present invention exhibits a value not more than $10 \times 10^{-4}$. Additionally, it also exhibits a value not more than $10 \times 10^{-4}$ when dielectric dissipation factors at a microwave region (1 to 5 GHz) are measured by cavity resonator method.

Preferably, the aluminum oxide sintered body of the present invention has aluminum oxide content of not less than 99.2% by weight. This permits a further improvement of plasma resistance and chemical resistance. Thus, a higher aluminum oxide content is more desirable. However, as the aluminum oxide purity increases, the influence of trace impurity on the sintering step increases, and phosphorous tends to hinder a uniform grain growth. It is therefore suitable that phosphorous content is not more than 0.0025 parts by weight. Aluminum oxide content is more preferably not less than 99.5% by weight.

Preferably, the aluminum oxide sintered body of the present invention contains magnesium oxide of not less than 0.05% by weight, and has a mean crystal particle size of not more than 10 μm. Specifically, since magnesium oxide has the effect of suppressing grain growth, it is possible to obtain a dense sintered body with a fewer voids, and retain a high mechanical strength. It is also possible to avoid dielectric dissipation factor degradation due to voids, and suppress satisfactorily the occurrence of cracks due to heat generation of the aluminum oxide sintered body.

Accordingly, it is desirable to contain at least a small amount of magnesium oxide as subsidiary component other than aluminum oxide in the aluminum oxide sintering step. Since a magnesium oxide content exceeding 0.5% by weight exerts adverse effect on chemical resistance and plasma resistance, its upper limit is more preferably 0.5% by weight. A high mechanical strength is attainable by controlling at the same time the mean crystal particle size of the aluminum oxide sintered body to not more than 10 μm. If phosphorous content exceeds 0.0025 parts by weight, the grain growth in the surface vicinity tends to be facilitated, resulting in a large mean crystal particle size. On the other hand, if the mean crystal particle size exceeds 10 μm, antifriction property and chemical resistance degrade. This is undesirable as a semiconductor manufacturing apparatus member, a liquid crystal manufacturing member, or a general industrial machinery member. More preferably, the mean crystal particle size is not more than 8 μm.

The following is a method of manufacturing an aluminum oxide sintered body of the present invention.

First, aluminum oxide powder containing less phosphorus and a subsidiary component other than aluminum oxide are mixed and ground by using, in general, a ball mill or a high-speed agitation type mill.

Usually, 0.003 to 0.005 parts by weight of phosphorous is contained in the aluminum oxide powder. Specifically, that is commonly mixed in soda-removing step for converting aluminum oxide obtained by Bayer's process into low soda aluminum oxide. The phosphorous content in an obtained low soda aluminum oxide can be controlled by limiting the phosphorous content in additive agents used for soda-removing. In the present invention, to control the phosphorous content in the aluminum oxide sintered body so obtained to not more than 0.0025 parts by weight, it is desirable to previously adjust the phosphorous content in the above aluminum oxide powder to not more than 0.0025 parts by weight.

To control the aluminum oxide content of an obtained aluminum oxide sintered body to not less than 99.2% by weight, at least one of magnesium oxide, calcium oxide and silicon oxide may be added as sintering agent. In order that magnesium oxide is contained in the range of not less than 0.05% by weight, other two components may be adjusted.

In the mixing and grinding, with water as solvent, wet grinding is performed to adjust to a predetermined particle size distribution by using balls composed of aluminum oxide sintered body or zirconia sintered body. To the slurry so obtained, organic binders such as polyvinyl-alcohol (PVA) and acrylic resin are added, depending on the purpose. Thereafter, dry granulation by means of spray drying is performed to prepare ceramic granules for forming.

The granules so obtained is formed by press forming, etc. and, as required, processed into a predetermined shape. This is a manufacturing method using dry press forming. Alternatively, wet forming method such as slip casting may be employed to obtain a predetermined shape.

Finally, the forming body so obtained is fired at temperatures of 1500° C. to 1700° C., thereby obtaining an aluminum oxide sintered body of the present invention.

To control the mean crystal particle size of the obtained aluminum oxide sintered body to not more than 10 μm, magnesium oxide as sintering agent may be contained in the range of not less than 0.05% by weight and then sintered at a suitable firing temperature.

The aluminum oxide sintered body of the present invention so obtained is usable as industrial machinery members and, in particular, suitably applicable to large and thick members used in semiconductor manufacturing apparatus members and liquid crystal manufacturing apparatus members. As used herein, the term "semiconductor manufacturing apparatus members" in the present invention means members for use in semiconductor manufacturing steps, such as nozzles, shower heads, inner walls, heat insulating materials, plasma traps, domes, susceptors, stages, chucks, cramp rings, focus rings, microwave inlet windows, and piping etc. The term "liquid crystal manufacturing apparatus members" means members for use in liquid crystal manufacturing steps, such as insulators and frames.

EXAMPLES

Examples of the present will be described below. It is understood, however, that the examples are for the purpose of illustration and the invention is not to be regarded as limited to any of the specific materials or condition therein.

Example 1

To low soda aluminum oxide powder, at least one of magnesium hydroxide, calcium carbonate and silicon oxide, and phosphorous were added as subsidiary components. With a high-speed distributed mill, this mixture was distributed into water to make into a slurry and then spray-dried to obtain ceramic powder. This ceramic powder was press-formed at 1000 kg/cm² into a forming body of 60 mm in diameter and 60 mm in thickness, and heated at 1650° C. for two hours, thereby obtaining an aluminum oxide sintered body.

To make a comparison of density between the interior and the surface vicinal portion in the sintered body so obtained, as shown in FIG. 1, 10-mm-cube samples 1 and 2 were cut from the interior and the surface vicinal portion, respectively, and their sintered densities were measured.

Further, the surface of the obtained aluminum oxide sintered body was lap-processed into a mirror finished surface. This was then set to a reactive ion etching (RIE) apparatus and exposed to plasma in an atmosphere of $Cl_2$ gas for two hours. The etching rate per minute was calculated from a decrement in weight before and after the exposure, and then found as a relative comparative value when the etching rate of an aluminum oxide sintered body prepared as a reference sample (whose aluminum oxide content was 99% by weight) was taken to be 1. Samples, whose relative comparative value was less than 1, were regarded as excellent one.

The aluminum oxide content, magnesium oxide content and phosphorous content in the sintered body were found from ICP emission spectrochemical analysis. The foregoing results are presented in Table 1.

As may be seen from Table 1, Sample No. 1 has a phosphorous content exceeding 0.0025 parts by weight, but its difference in density between the sintered body surface vicinity and the interior is 0.020 g/cm³, that is, little difference. The reason for this can be considered that liquid phase sintering proceeds mainly because the aluminum oxide content of Sample 1 is not more than 99% by weight, and therefore the influence of phosphorous on the sintering step becomes lessened. The etching rate of Sample 1, however, is not less than 1 Å/min, failing to exhibit excellent plasma resistance.

A comparison of Sample Nos. 2 to 6, 8 to 10 with Sample 7 indicates that each difference in density between the sintered body surface vicinity and the interior is not more than 0.05 g/cm³, and each etching rate is not more than 1 Å/min, thereby exhibiting excellent characteristic. Especially, when phosphorous content is not more than 0.0020 parts by weight, the difference in density between the sintered body surface vicinity and the interior is not more than 0.035 g/cm³. This indicates that a low phosphorous content does not hinder the grain growth in the sintering step, thereby obtaining a uniform sintered body.

Example 2

To the same aluminum oxide powder as in Example 1, at least one of magnesium hydroxide, calcium carbonate and silicon oxide, and phosphorous were added as subsidiary components. In the same manner as in Example 1, an aluminum oxide sintered body was obtained.

Subsequently, the densities in the sintered body surface vicinity and the interior, and etching rate were measured in the same manner as in Example 1. In addition, dielectric dissipation factor was also measured.

The foregoing results are presented in Table 2.

TABLE 1

| | Composition of sintered body | | | | | Density of sintered body | | | |
|---|---|---|---|---|---|---|---|---|---|
| Sample No. | Aluminum oxide [% by weight] | Magnesium oxide [% by weight] | Calcium oxide [% by weight] | Silicon oxide [% by weight] | Phosphorus content (1) [Parts by weight] | Surface vicinity [g/cm³] | Interior [g/cm³] | Difference in density [g/cm³] | Etching rate [Å/min] |
| 1* | 98.80 | 0.24 | 0.26 | 0.65 | 0.0030 | 3.838 | 3.818 | 0.020 | 1.85 |
| 2 | 99.00 | 0.24 | 0.14 | 0.59 | 0.0018 | 3.880 | 3.854 | 0.026 | 0.78 |
| 3 | 99.20 | 0.24 | 0.08 | 0.44 | 0.0014 | 3.891 | 3.874 | 0.017 | 0.52 |
| 4 | 99.20 | 0.23 | 0.08 | 0.43 | 0.0018 | 3.895 | 3.868 | 0.027 | 0.63 |
| 5 | 99.20 | 0.23 | 0.09 | 0.42 | 0.0020 | 3.894 | 3.859 | 0.035 | 0.65 |
| 6 | 99.20 | 0.24 | 0.10 | 0.43 | 0.0025 | 3.888 | 3.848 | 0.040 | 0.77 |
| 7* | 99.20 | 0.23 | 0.09 | 0.44 | 0.0030 | 3.889 | 3.824 | 0.065 | 1.03 |
| 8 | 99.60 | 0.10 | 0.01 | 0.18 | 0.0018 | 3.910 | 3.875 | 0.035 | 0.52 |
| 9 | 99.75 | 0.23 | — | — | 0.0018 | 3.913 | 3.880 | 0.033 | 0.47 |
| 10 | 99.95 | 0.03 | — | — | 0.0017 | 3.920 | 3.895 | 0.025 | 0.41 |

Sample marked '*' is not included in the scope of the present invention.
Note:
(1) Phosphorus content to 100 parts by weight of aluminum oxide sintered body

TABLE 2

| Sample No. | Composition of sintered body | | | | Phosphorus content (1) [Parts by weight] | Density of sintered body | | | Dielectric dissipation factor ($\times 10^{-4}$) | Etching rate [Å/min] |
|---|---|---|---|---|---|---|---|---|---|---|
| | Aluminum oxide [% by weight] | Magnesium oxide [% by weight] | Calcium oxide [% by weight] | Silicon oxide [% by weight] | | Surface vicinity [g/cm³] | Interior [g/cm³] | Difference in density [g/cm³] | | |
| 11 | 99.00 | 0.24 | 0.13 | 0.59 | 0.0018 | 3.882 | 3.855 | 0.027 | 8.0 | 0.77 |
| 12 | 99.00 | 0.23 | 0.13 | 0.58 | 0.0025 | 3.874 | 3.830 | 0.044 | 10.0 | 0.88 |
| 13* | 99.00 | 0.47 | 0.12 | 0.33 | 0.0030 | 3.871 | 3.805 | 0.066 | 40.0 | 1.78 |
| 14 | 99.20 | 0.24 | 0.08 | 0.43 | 0.0018 | 3.892 | 3.869 | 0.023 | 1.0 | 0.60 |
| 15 | 99.20 | 0.23 | 0.09 | 0.42 | 0.0025 | 3.889 | 3.851 | 0.038 | 5.0 | 0.72 |
| 16* | 99.20 | 0.23 | 0.08 | 0.44 | 0.0030 | 3.888 | 3.822 | 0.066 | 25.0 | 1.56 |
| 17 | 99.60 | 0.10 | 0.09 | 0.18 | 0.0017 | 3.910 | 3.888 | 0.022 | 1.0 | 0.48 |
| 18 | 99.60 | 0.10 | 0.08 | 0.17 | 0.0024 | 3.902 | 3.870 | 0.032 | 3.0 | 0.56 |
| 19* | 99.60 | 0.08 | 0.08 | 0.18 | 0.0042 | 3.890 | 3.820 | 0.070 | 65.0 | 1.55 |
| 20 | 99.75 | 0.23 | — | — | 0.0014 | 3.920 | 3.901 | 0.019 | 1.0 | 0.41 |
| 21 | 99.75 | 0.23 | — | — | 0.0019 | 3.916 | 3.874 | 0.042 | 1.0 | 0.46 |
| 22 | 99.75 | 0.22 | — | — | 0.0025 | 3.905 | 3.856 | 0.049 | 1.0 | 0.51 |
| 23* | 99.75 | 0.21 | — | — | 0.0030 | 3.912 | 3.844 | 0.068 | 12.0 | 1.01 |
| 24* | 99.75 | 0.21 | — | — | 0.0034 | 3.912 | 3.833 | 0.079 | 22.0 | 1.35 |
| 25* | 99.75 | 0.23 | — | — | 0.0041 | 3.905 | 3.829 | 0.076 | 28.0 | 1.38 |

Sample marked '*' is not included in the scope of the present invention.
Note:
(1) Phosphorus content to 100 parts by weight of aluminum oxide sintered body As may be seen from Table 2, Sample Nos. 11 and 12, the phosphorous content of which is not more than 0.0025 parts by weight, are 0.05 g/cm³ in the difference in density between the sintered body surface vicinity and the interior, and are not more than $10 \times 10^{-4}$ in dielectric dissipation factor value, thus attaining excellent results. These samples also exhibit excellent characteristics in etching rate, that is, not more than 1 Å/min. On the other hand, Sample No. 13, the phosphorous content of which is 0.0030 parts by weight, is as large as 0.066 g/cm³ in the difference in density between the sintered body surface vicinity and the interior, and is not less than $10 \times 10^{-4}$ in dielectric dissipation factor value. This sample also has a poor etching rate of 1.78 Å/min.

Sample Nos. 16 and 19 have an aluminum oxide content of 99.20% by weight and 99.60% by weight, respectively, and a phosphorous content exceeding 0.0025 parts by weight. As compared with the sample having a phosphorous content of 0.0025 parts by weight, both Samples have a dielectric dissipation factor of not less than $10 \times 10^{-4}$ and an etching rate of not less than 1 Å/min, exhibiting poor results.

Sample No. 20, the phosphorous content of which is further reduced to 0.0014 parts by weight, has excellent characteristics in the difference in density between the surface vicinity and the interior, dielectric dissipation factor, and etching rate. This indicates that, as the aluminum oxide purity increases, the phosphorous content exerts a greater influence on sintering.

Example 3

Aluminum oxide sintered bodies were obtained in the same manner as in Examples 1 and 2. With use of the obtained sintered bodies, the densities in the sintered body surface vicinity and the interior, etching rate, four-point bending strength, and mean crystal particle size were measured. The mean crystal particle size was measured on image analysis (LUZEX). The foregoing results are presented in Table 3.

TABLE 3

| Sample No. | Composition of sintered body | | | | Phosphorus content (1) [Parts by weight] | Density of sintered body | | | Mean crystal particle size [µm] | Four-point bending strength [MPa] | Etching rate [Å/min] |
|---|---|---|---|---|---|---|---|---|---|---|---|
| | Aluminum oxide [% by weight] | Magnesium oxide [% by weight] | Calcium oxide [% by weight] | Silicon oxide [% by weight] | | Surface vicinity [g/cm³] | Interior [g/cm³] | Difference in density [g/cm³] | | | |
| 26* | 99.00 | 0.00 | 0.25 | 0.69 | 0.0018 | 3.861 | 3.832 | 0.029 | 19.0 | 295 | 1.20 |
| 27 | 99.00 | 0.10 | 0.26 | 0.59 | 0.0018 | 3.878 | 3.834 | 0.044 | 10.0 | 350 | 0.82 |
| 28 | 99.00 | 0.24 | 0.14 | 0.59 | 0.0018 | 3.882 | 3.854 | 0.028 | 8.0 | 375 | 0.77 |
| 29* | 99.20 | 0.00 | 0.32 | 0.45 | 0.0017 | 3.869 | 3.838 | 0.031 | 16.5 | 302 | 1.08 |
| 30 | 99.20 | 0.11 | 0.23 | 0.44 | 0.0017 | 3.885 | 3.844 | 0.041 | 9.5 | 355 | 0.72 |
| 31 | 99.20 | 0.24 | 0.08 | 0.44 | 0.0018 | 3.894 | 3.865 | 0.029 | 7.5 | 380 | 0.63 |
| 32* | 99.60 | 0.00 | 0.09 | 0.00 | 0.0017 | 3.898 | 3.845 | 0.053 | 13.0 | 320 | 0.88 |
| 33 | 99.60 | 0.05 | 0.14 | 0.17 | 0.0017 | 3.912 | 3.869 | 0.043 | 8.0 | 386 | 0.52 |
| 34 | 99.60 | 0.11 | 0.09 | 0.17 | 0.0017 | 3.915 | 3.879 | 0.036 | 5.0 | 410 | 0.51 |
| 35* | 99.75 | 0.00 | 0.11 | 0.10 | 0.0018 | 3.920 | 3.892 | 0.028 | 10.5 | 324 | 0.66 |
| 36 | 99.75 | 0.06 | — | 0.17 | 0.0018 | 3.920 | 3.882 | 0.038 | 6.0 | 379 | 0.50 |
| 37 | 99.75 | 0.23 | — | — | 0.0019 | 3.915 | 3.890 | 0.025 | 3.5 | 434 | 0.44 |

Sample marked '*' is not included in the scope of the present invention.
Note:
(1) Phosphorus content to 100 parts by weight of aluminum oxide sintered body As may be seen from Table 3, in Sample Nos. 27 and 28, the magnesium oxide content in the sintered body is not less than 0.05% by weight, and the residue consists of calcium oxide and silicon oxide (silica), and aluminum oxide purity is 99.00% by weight. The difference in density between the surface vicinity and the interior is not more than 0.05 g/cm$^3$, resulting in a uniform sintered body. These samples have excellent characteristic in etching rate, that is, not more than 0.82 Å/min. In addition, they have a mean particle size of not more than 10 μm, and a four-point bending strength of not less than 350 MPa. The foregoing results indicate that Sample Nos. 27 and 28 have sufficient performances as the aluminum oxide sintered body for structural members. On the other hand, in Sample No. 26, the magnesium oxide content is zero, and the residue consists of calcium oxide and silicon oxide, and aluminum oxide purity is 99.00% by weight. The difference in density between the surface vicinity and the interior is 0.05 g/cm$^3$, resulting in a uniform sintered body. However, its mean particle size is not less than 10 μm and the four-point bending strength is 295 MPa, which are poor results. Its dielectric dissipation factor value is not more than $10 \times 10^{-4}$, and its etching rate exceeds 1 Å/min, thus failing to attain suitable characteristics.

In Sample Nos. 30, 31, 33, 34, 36 and 37, each contains magnesium oxide of not less than 0.05% by weight, and the residue consists of calcium oxide and silicon oxide so as to have an aluminum oxide purity of 99.20% by weight, 99.60% by weight, or 99.75% by weight. In each of these samples, the difference in density between the surface vicinity and the interior is not more than 0.05 g/cm$^3$, resulting in a uniform sintered body. Each sample has an excellent characteristic in etching rate, that is, not more than 1 Å/min. In addition, each sample has a mean particle size of not more than 10 μm, and a four-point bending strength of not less than 350 MPa. The foregoing results indicate that these samples have sufficient performances as the aluminum oxide sintered body for structural members. On the other hand, in Sample Nos. 29, 32, and 35, no magnesium oxide is contained, and the residue consists of calcium oxide and silica so as to have an aluminum oxide purity of 99.20% by weight, 99.60% by weight, or 99.75% by weight. Each mean particle size exceeds 10 μm and the four-point bending strength is not more than 350 MPa, thus failing to attain suitable characteristics.

What is claimed is:

1. An aluminum oxide sintered body containing aluminum oxide in an amount of not less than 99% by weight and at least one selected from magnesium oxide, calcium oxide and silicon oxide, and containing phosphorus of not more than 0.0025 parts by weight to 100 parts by weight of said aluminum oxide sintered body, wherein the content of said phosphorus is not less than 0.0014 parts by weight to 100 parts by weight of said aluminum oxide sintered body.

2. The aluminum oxide sintered body according to claim 1, wherein a difference in density between a surface vicinity and an interior is not more than 0.05 g/cm$^3$.

3. The aluminum oxide sintered body according to claim 1, wherein a dielectric dissipation factor is not more than $10 \times 10^{-4}$.

4. The aluminum oxide sintered body according to claim 1, wherein the amount of said aluminum oxide is not less than 99.2% by weight.

5. The aluminum oxide sintered body according to claim 2, wherein a surface vicinity has a density of not less than 3.90 g/cm$^3$.

6. A semiconductor manufacturing apparatus member composed of an aluminum oxide sintered body according to claim 1.

7. A liquid crystal manufacturing apparatus member composed of an aluminum oxide sintered body according to claim 1.

* * * * *